United States Patent
Moon et al.

(10) Patent No.: US 10,211,866 B2
(45) Date of Patent: Feb. 19, 2019

(54) DUAL RECEIVE PROCESSING IN WIRELESS COMMUNICATIONS

(71) Applicant: MediaTek Singapore Pte. Ltd., Singapore (SG)

(72) Inventors: Jangwook Moon, San Diego, CA (US); Tze-Ping Low, Lexington, MA (US); Craig Burnet, Hertfordshire (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/866,797

(22) Filed: Jan. 10, 2018

(65) Prior Publication Data

US 2018/0145711 A1   May 24, 2018

Related U.S. Application Data

(62) Division of application No. 14/942,962, filed on Nov. 16, 2015, now Pat. No. 9,900,036.

(60) Provisional application No. 62/084,626, filed on Nov. 26, 2014.

(51) Int. Cl.
| | |
|---|---|
| H04L 1/00 | (2006.01) |
| H04B 1/16 | (2006.01) |
| H04B 1/7103 | (2011.01) |
| H04L 1/06 | (2006.01) |
| H04L 1/20 | (2006.01) |

(52) U.S. Cl.
CPC ......... *H04B 1/1607* (2013.01); *H04B 1/7103* (2013.01); *H04L 1/0045* (2013.01); *H04L 1/0618* (2013.01); *H04L 1/20* (2013.01)

(58) Field of Classification Search
CPC ... H04B 1/7103; H04L 1/0045; H04L 1/0618; H04L 1/20
See application file for complete search history.

(56) References Cited

U.S. PATENT DOCUMENTS

| | | | |
|---|---|---|---|
| 2003/0081658 A1* | 5/2003 | Messier | H04B 1/7103 375/147 |
| 2007/0127589 A1* | 6/2007 | Hwang | H04B 7/0848 375/267 |

* cited by examiner

*Primary Examiner* — Janice N Tieu
(74) *Attorney, Agent, or Firm* — Han IP PLLC; Andy M. Han

(57) ABSTRACT

A technique, as well as select implementations thereof, pertaining to dual receive processing in wireless communications is described. The technique may involve receiving, by a plurality of receive processing modules, an incoming signal from an antenna to provide a plurality of processing results. The technique may also involve generating, by a determination mechanism, a determination output based on the plurality of processing results. The determination output may include either one or more decoding metrics based on a respective processing result from one of the plurality of receive processing modules or a weighted combination of more than one respective processing result from more than one receive processing module of the plurality of receive processing modules. The technique may further involve decoding, by a decoder, the determination output to provide a decoded signal.

6 Claims, 7 Drawing Sheets

DUAL RECEIVE PROCESSING IN WIRELESS COMMUNICATIONS

CROSS REFERENCE TO RELATED PATENT APPLICATIONS

The present disclosure is part of a divisional of U.S. patent application Ser. No. 14/942,962, filed on 16 Nov. 2015 and claiming the priority benefit of U.S. Provisional Patent Application No. 62/084,626, filed on 26 Nov. 2014. Contents of aforementioned applications are incorporated by reference in their entirety.

TECHNICAL FIELD

The present disclosure is generally related to wireless communications and, more particularly, to dual receive processing in wireless communications.

BACKGROUND

Unless otherwise indicated herein, approaches described in this section are not prior art to the claims listed below and are not admitted as prior art by inclusion in this section.

To meet the exploding demand for higher capacity, increasingly advanced receivers are considered and developed to combat various scenarios. For example, in Long Term Evolution (LTE) Rel-12, the so-called Network Assisted Interference Cancellation and Suppression (NA-ICS) receiver is standardized in $3^{rd}$ Generation Partnership Project (3GPP) to effectively cancel inter-cell interference. As the name implies, some information is provided by Evolved Node B (eNB) to aid interference cancellation. From the perspective of eNB, inter-eNB information exchanges are required to provide the information to user equipment (UE). However, depending on the backhaul type, there could be delays of inter-eNB information exchange that can be intolerably long for NAICS receivers to work properly. In this case, the information conveyed to a UE would be outdated, and would not match to the current scheduling decision. In this case, the overall performance would be much degraded making it even worse than a conventional Rel-11 receiver.

In general, when an advanced receiver involves much estimation and detection, the estimation/detection results can also become inaccurate, thereby degrading the overall performance to be worse than the conventional receiver. To cope with this problem, a dual receiver structure can be used. In this type of receiver, multiple receivers run in parallel. In LTE, for example, a default receiver, such as a Minimum Mean Square Error and Interference Rejection Combiner (MMSE-IRC) receiver, and a NAICS receiver could run in parallel. However, in the last stage (i.e., before feeding the decoding metric to the decoder), some selection or combining methods are necessary. Without this, the turbo decoder would need to run twice, which is not desirable.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

Various implementations of a multi-receiver structure are presented herein. The multi-receiver structure having multiple component receivers in accordance with the present disclosure may effectively outperform pre-defined minimum performance by optimally combining or selecting the output of each component receiver, with one of the component receiver providing baseline minimum performance. An example of dual processing discussed in the present disclosure may include two component receivers such as, for instance, a simple MMSE-based receiver and an advanced receiver. Usually an advanced receiver is more susceptible to estimation and/or detection errors, which can degrade its performance to a level worse than that of the default simple MMSE-based receiver. In this situation, the dual processing in accordance with the present disclosure can easily guarantee or outperform the minimum performance.

For illustration of the novel concept of the present disclosure, four example combining methods for dual receive processing are disclosed herein. The first and second example combining methods use estimated probability or similar metric of the received sequences. The second and third example combining methods eliminate the need of calculating the decoding metric twice for a simpler architecture and construction of a receiver. The fourth example combining method directly uses the decoding results, and can intelligently find the better receiver of the two by utilizing a "decoding success" and a "decoding failure" event. This enables the proposed dual receive processing to select the better receiver in any kind of interference scenario. The example combining methods are expected to provide good ways to effectively select and combine the output of each receiver.

It is noteworthy that, although examples and implementations in the present disclosure may be provided in the context of wireless communications based on LTE, the proposed techniques, methods, devices, apparatuses, systems, structures and architectures may also be applied to any other scenarios where multiple receive processing is suitable or necessary. It is also noteworthy that, although examples and implementations in the present disclosure may be provided in the context of a two-receiver structure/architecture, the proposed techniques, methods, devices, apparatuses, systems, structures and architectures may also be easily extended to structures and architectures with more than two component receivers. For instance, the proposed receiver structure may be easily extended so that it includes N different component receivers where N is a positive integer greater than 1. Advantageously, implementations in accordance with the present disclosure may effectively achieve dual receive processing without running the decoder twice.

In one example implementation, an apparatus may include an antenna, a plurality of receive processing modules, a determination mechanism, and a decoder. The antenna may be configured to receive an incoming signal. The plurality of receive processing modules may include at least a first receive processing module and a second receive processing module. Each of the plurality of receive processing modules may be coupled to the antenna and configured to receive the incoming signal from the antenna and process the incoming signal to produce a respective processing result. The determination mechanism may be configured to receive the processing results from the plurality of receive processing modules and generate a determination output. The determination output may include either one or more decoding metrics based on a respective processing result from one of the plurality of receive processing modules or a weighted combination of more than one respective processing result from more than one receive processing module of the plurality of receive processing modules. The decoder may be configured to receive the determination output from the determination mechanism and decode the determination output to provide a decoded signal.

In another example implementation, a method may involve a plurality of receive processing modules receiving an incoming signal from an antenna to provide a plurality of processing results. The plurality of receive processing modules may include at least a first receive processing module and a second receive processing module. The method may also involve a determination mechanism generating a determination output based on the plurality of processing results. The determination output may include either of: (1) one or more decoding metrics based on a respective processing result from one of the plurality of receive processing modules, or (2) a weighted combination of more than one respective processing result from more than one receive processing module of the plurality of receive processing modules. The method may further involve a decoder decoding the determination output to provide a decoded signal.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Assume that a t-th received symbol may be expressed as Equation (1) below.

$$y_t = S_t + I_t + N_t \quad (1)$$

For simplicity, the index t is dropped in the description below. In Equation (1), S denotes the desired message symbol, I denotes the interference symbol, and N denotes the noise component. For example, in 3GPP, a MMSE-IRC receiver is designed to detect S considering I+N as effective noise. However, in a NAICS receiver, S and I are considered as signals, and they are jointly decoded. If a dual processing structure is applied in this case, MMSE-IRC and NAICS receivers would run in parallel. Both receivers generate decoding metrics such as, for example, log-likelihood ratios for each symbol. To avoid running a turbo decoder twice, it is necessary to select one of the two metrics, or combine them in a preferable way. The following description pertains to various techniques on how to combine the two metrics in accordance with the present disclosure.

A first combining technique according to the present disclosure may include procedures that are applied to blocks of symbols separately. A block of symbols may be, for example, a frequency domain-physical resource block (PRB) in LTE, or it may be all allocated PRBs in the extreme case. For the interested block of transmission, a first receiver (e.g., a MMSE-IRC receiver in 3GPP) may calculate a weighting factor that represents the statistical property of the received signal. For example, a probability that the received symbols are received may be one possible metric. The probability may be expressed as Equation (2) below.

$$P_1 = \prod_t \{\max p(y_t | S = s_j), j = 0, \ldots, |S| - 1\} \quad (2)$$

In Equation (2), $s_j$ denotes one of the constellations that S uses, and /S/ denotes the cardinality of the constellation. For each received symbol, the best probability may be calculated and accumulated.

Similarly, a second receiver (e.g., a NAICS receiver in 3GPP) may calculate similar probability according to Equation (3) below.

$$P_2 = \prod_t \{\max p(y_t | S = s_j, I = i_k), j = 0, \ldots, |S| - 1, k = 0, \ldots, |I| - 1\} \quad (3)$$

In Equation (3), $i_k$ denotes one of the constellations that I uses, and /I/ denotes the cardinality of the constellation.

The two probabilities represent how closely each receiver can represent the received symbols. Therefore, it is useful to use these two probabilities as a weighting factors in combining the two decoding metrics.

Figure 1:
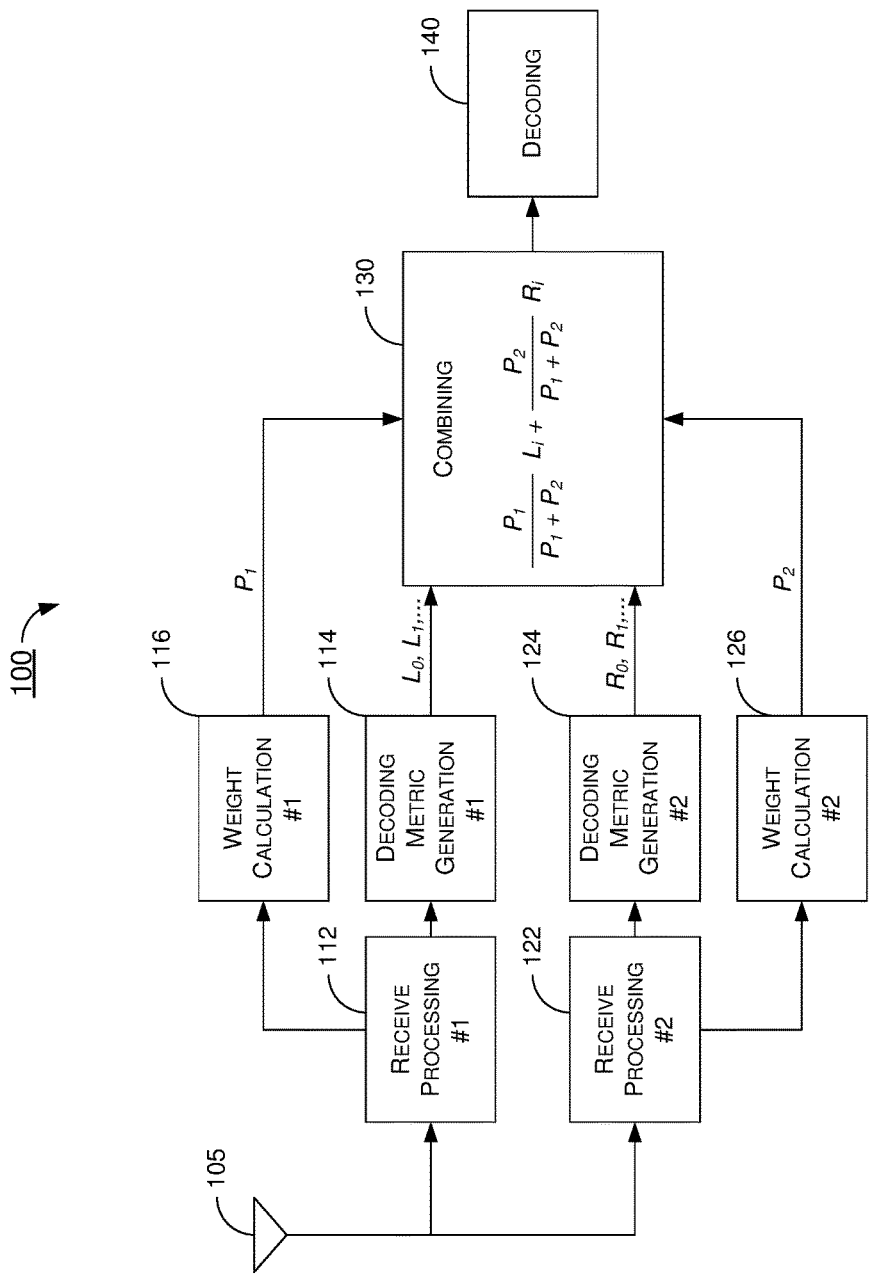
FIG. 1 is a block diagram of an example receiver architecture in accordance with a first combining technique of the present disclosure.

FIG. 1 illustrates an example receiver architecture 100 in accordance with the first combining technique. Receiver architecture 100 may include a number of functional blocks such as, for example, first receive processing 112, first decode metric generation 114, first weight calculation 116, second receive processing 122, second decode metric generation 124, second weight calculation 126, combining 130 and decoding 140. The functional blocks of first receive processing 112, first decode metric generation 114 and first weight calculation 116 may be functional blocks of a first receiver, e.g., a MMSE-IRC receiver, and configured to receive an incoming signal from antenna 105 and generate decoding metrics, e.g., $L_0$, $L_1$, etc. shown in FIG. 1, and a probability $P_1$ as a weighting factor. That is, the functional block of first receive processing 112 may perform receive processing as a MMSE-IRC receive processing module. The functional blocks of second receive processing 122, second decode metric generation 124 and second weight calculation 126 may be functional blocks of a second receiver, e.g., a NAICS receiver, and configured to receive the incoming signal from antenna 105 and generate decoding metrics, e.g., $R_0$, $R_1$, etc. shown in FIG. 1, and a probability $P_2$ as a weighting factor. That is, the functional block of second receive processing 122 may perform receive processing as a NAICS receive processing module. The functional block of combining 130 may receive the decoding metrics and weighting factors from first and second receivers and combine the decoding metrics with the weighting factors to provide an output as follows: $(P_1/(P_1+P_2))*L_i+(P_2/(P_1+P_2))*R_i$. The functional block of decoding 140 may decode the output of the functional block of combining 130.

It is noteworthy that although the example illustrated in FIG. 1 shows the functional blocks of two component receivers, the first combining technique is applicable to implementations in which there are more than two component receivers. Therefore, the scope of implementations based on the first combining technique in accordance with the present disclosure is not limited to two component receivers.

As stated earlier, the weighting factors may be determined separately for each block of symbols to provide more flexibility.

When noise term N is distributed with a specific density (e.g., Gaussian distribution is a general assumption), the expression of $P_1$ and $P_2$ can be simplified with mathematical manipulations. For example, for Gaussian noise, if a logarithm is taken for the expressions of $P_i$, a distance between the received symbol Y and the constructed symbol may be obtained using the best constellation. This distance may be used as the weighting factor instead of the probabilities. When the distance is utilized, the role of $P_1$ and $P_2$ needs to be swapped as the smaller distance is better in this case.

Alternatively, noise estimate may be used for the weighting factor. When the noise estimate is small in one receiver, it would be better to put more weight on the outputs from that receiver. Similarly, when the noise estimate is utilized, the role of $P_1$ and $P_2$ needs to be swapped as the smaller noise is better in this case.

Alternatively, any variations of the probability expression or similar metrics that represent the "closeness" between Y and the constructed symbol may also be used. For example, mutual information (MI) between the received symbols and the transmitted bits, b, may be expressed as Equation (4) below.

$$I(b;Y) = \sum_b \sum_Y p(b,Y) \log \frac{p(b,Y)}{p(b)p(Y)} \quad (4)$$

The MI may also be used as a weighting factor. In other words, MI calculated from each component receiver may be used in place of the weighting factor. In general, depending on the complexity of implementation or performance, different metric may be chosen to meet certain requirements in accordance with the present disclosure.

A second combining technique according to the present disclosure may be a variation of the first combining technique. Under the second combining technique, the weighting factors may be used to select the better receiver before generating the decoding metric. Then, the decoding metric is calculated for the selected receiver. In this way the complexity of calculating two decoding metrics may be eliminated.

Figure 2:
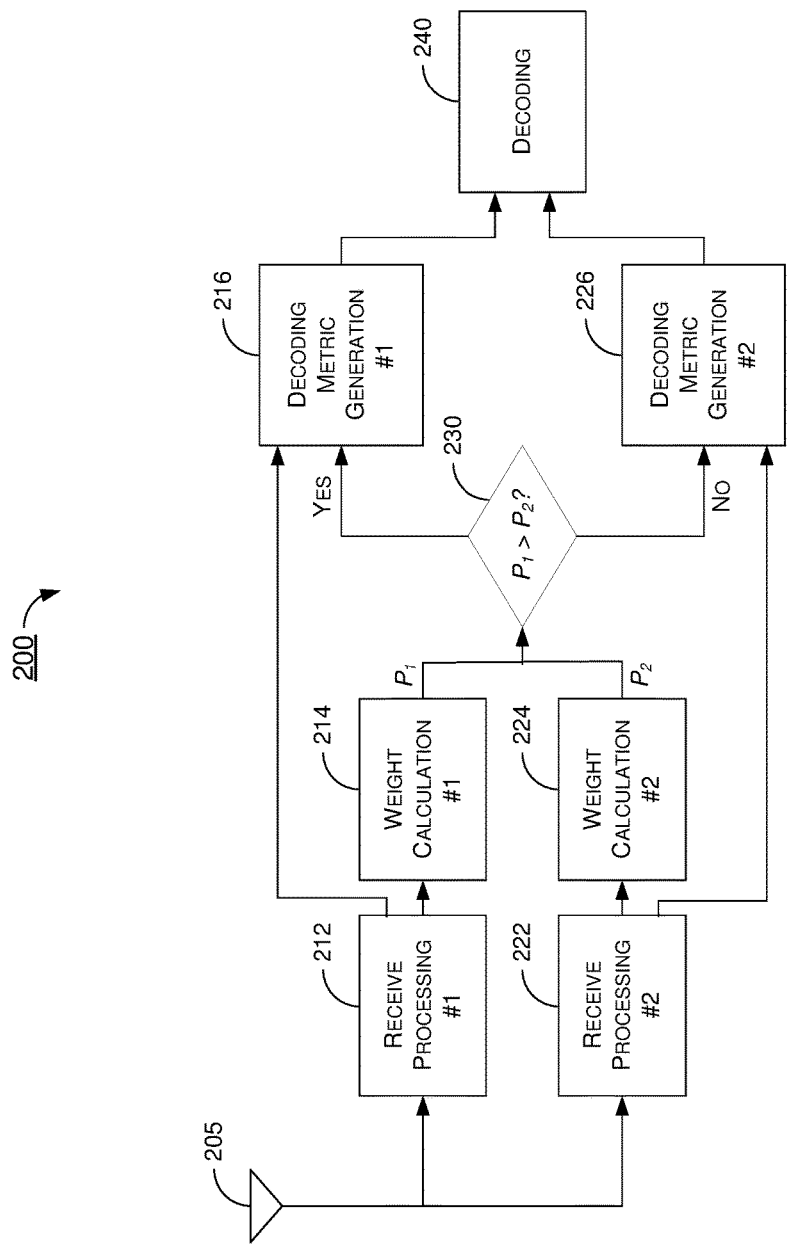
FIG. 2 is a block diagram of an example receiver architecture in accordance with a second combining technique of the present disclosure.

FIG. 2 illustrates an example receiver architecture 200 in accordance with the second combining technique. Receiver architecture 200 may include a number of functional blocks such as, for example, first receive processing 212, first weight calculation 214, first decoding metric generation 216, second receive processing 222, second weight calculation 224, second decoding metric generation 226, decision 230 and decoding 240. The functional blocks of first receive processing 212, first weight calculation 214 and first decoding metric generation 216 may be functional blocks of a first receiver, e.g., a MMSE-IRC receiver, and configured to receive an incoming signal from antenna 205 and generate a probability $P_1$ as a weighting factor. That is, the functional block of first receive processing 212 may perform receive processing as a MMSE-IRC receive processing module. The functional blocks of second receive processing 222, second weight calculation 224 and second decoding metric generation 226 may be functional blocks of a second receiver, e.g., a NAICS receiver, and configured to receive the incoming signal from antenna 205 and generate a probability $P_2$ as a weighting factor. That is, the functional block of second receive processing 222 may perform receive processing as a NAICS receive processing module. The functional block of selection 230 may determine which of $P_1$ and $P_2$ is greater. In the event that $P_1$ is greater than $P_2$, the functional block of decision 230 may select the first receiver and thus the functional block of first decoding metric generation 216 may be selected to generate the decoding metric for the functional block of decoding 240 to decode. Otherwise, in the event that $P_1$ is not greater than $P_2$, the functional block of decision 230 may select the second receiver and thus the functional block of second decoding metric generation 226 may be selected to generate the decoding metric for the functional block of decoding 240 to decode.

Similarly, any variation of the probabilities or similar metric may also be used to select the one of two branches. As with the first combining technique, the inequality in the decision step needs to be swapped when the distance or noise estimate is used as the weighting factor.

It is noteworthy that although the example illustrated in FIG. 2 shows the functional blocks of two component receivers, the second combining technique is applicable to implementations in which there are more than two component receivers. Therefore, the scope of implementations based on the second combining technique in accordance with the present disclosure is not limited to two component receivers.

A third combining technique according to the present disclosure may involve applying the combining before calculating the decoding metric. An example of the third combining technique is log-likelihood ratio (LLR). Assuming equi-probable message bits in the transmitter, LLR may be defined by Equation (5) below.

The combining can be applied before calculating the decoding metric, e.g., LLR. Assuming equi-probable message bits in the transmitter, LLR is defined as $$LLR = \log \frac{p(y|b=0)}{p(y|b=1)} \quad (5)$$

By utilizing the weighting factors directly in Equation (5), LLR may be modified and expressed by Equation (6) below.

$$LLR = \log \frac{p_1(y|b=0)w_{rec1} + p_2(y|b=0)w_{rec2}}{p_1(y|b=1)w_{rec1} + p_2(y|b=1)w_{rec2}} \quad (6)$$

In Equation (6), each of $p_1$ and $p_2$ denotes the probability assuming the first and second receive processing, respectively. Moreover, each of $w_{rec1}$ and $w_{rec2}$ denotes the normalized weighting factor for the respective component receiver. They are normalized so that the sum is one. As with the second combining technique, the third combining technique also provides the advantage of calculating the decoding metric only once.

Figure 3:
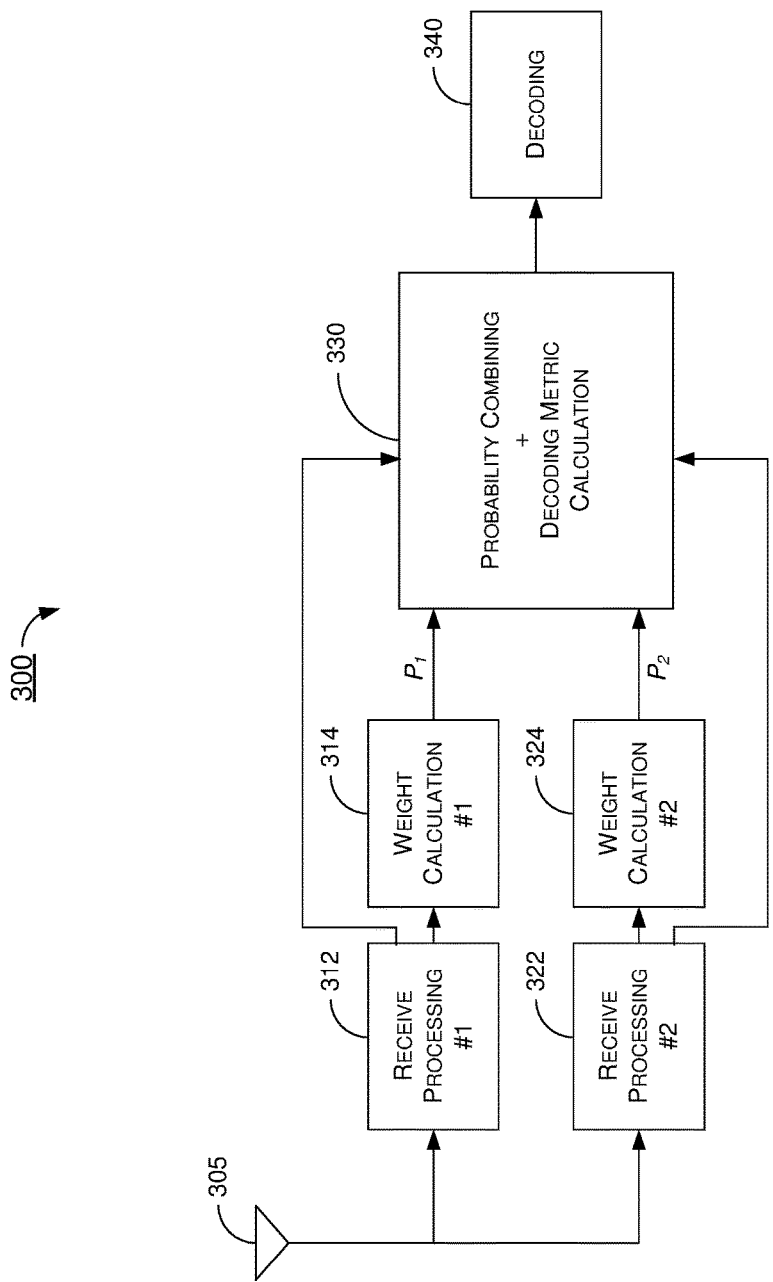
FIG. 3 is a block diagram of an example receiver architecture in accordance with a third combining technique of the present disclosure.

FIG. 3 illustrates an example receiver architecture 300 in accordance with the third combining technique. Receiver architecture 300 may include a number of functional blocks such as, for example, first receive processing 312, first weight calculation 314, second receive processing 322, second weight calculation 324, probability combining and decoding metric calculation 330 and decoding 340. The functional blocks of first receive processing 312 and first weight calculation 314 may be functional blocks of a first receiver, e.g., a MMSE-IRC receiver, and configured to receive an incoming signal from antenna 305 and generate a probability $P_1$. That is, the functional block of first receive processing 312 may perform receive processing as a MMSE-IRC receive processing module. The functional blocks of second receive processing 322 and second weight calculation 324 may be functional blocks of a second receiver, e.g., a NAICS receiver, and configured to receive the incoming signal from antenna 305 and generate a probability $P_2$. That is, the functional block of second receive processing 322 may perform receive processing as a NAICS receive processing module. The functional block of probability combining and decoding metric calculation 330 may perform probability combining and decoding metric calculation using LLR as expressed in Equation (6) to generate the decoding metric for the functional block of decoding 340 to decode.

It is noteworthy that although the example illustrated in FIG. 3 shows the functional blocks of two component receivers, the third combining technique is applicable to implementations in which there are more than two component receivers. Therefore, the scope of implementations based on the third combining technique in accordance with the present disclosure is not limited to two component receivers.

A fourth combining technique according to the present disclosure may, instead of calculating the probability for each receiver, utilize the decoding result (e.g., whether a result of the decoding is a success or failure) to control the weighting factor. Accordingly, the fourth combining technique may be much simpler than the first combining technique in actual implementation.

Figure 4:
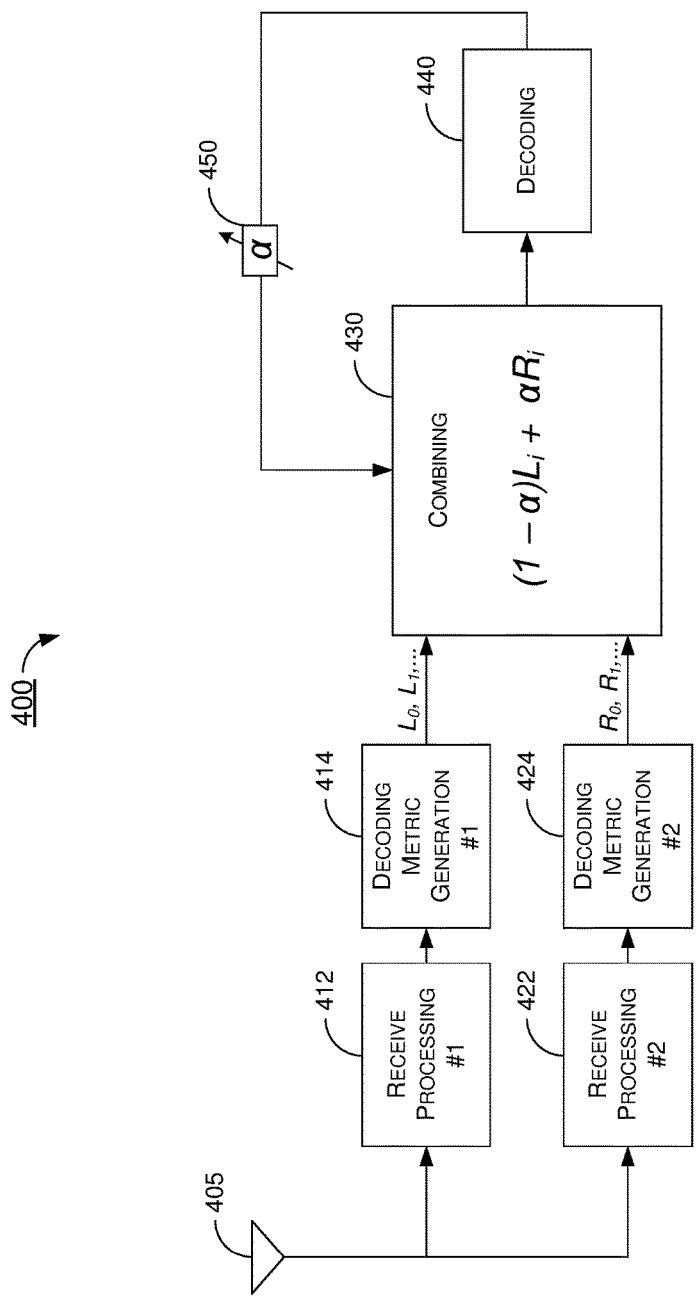
FIG. 4 is a block diagram of an example receiver architecture in accordance with a fourth combining technique of the present disclosure.

FIG. 4 illustrates an example receiver architecture 400 in accordance with the third combining technique. Receiver architecture 400 may include a number of functional blocks such as, for example, first receive processing 412, first decoding metric generation 414, second receive processing 422, second decoding metric generation 424, combining 430, decoding 440 and weighting factor adjustment 450. The functional blocks of first receive processing 412 and first decoding metric generation 414 may be functional blocks of a first receiver, e.g., a MMSE-IRC receiver, and configured to receive an incoming signal from antenna 405 and generate a probability $P_1$. That is, the functional block of first receive processing 412 may perform receive processing as a MMSE-IRC receive processing module. The functional blocks of second receive processing 422 and second weight calculation 424 may be functional blocks of a second receiver, e.g., a NAICS receiver, and configured to receive the incoming signal from antenna 405 and generate a probability $P_2$. That is, the functional block of second receive processing 422 may perform receive processing as a NAICS receive processing module. The functional block of combining 430 may receive the decoding metrics from first and second receivers and combine the decoding metrics with a weighting factor $\alpha$ as follows: $(1-\alpha)*L_i+\alpha*R_i$. The functional block of decoding 440 may decode the output of the functional block of combining 430. The functional block of weighting factor adjustment 450 may, based on the output of the functional block of decoding 440, adjust the weighting factor $\alpha$ by utilizing a decoding result (e.g., output) of the functional block of decoding 440.

For illustrative purpose without limiting the scope of the present disclosure, an example algorithm for adjusting the value of weighting factor $\alpha$, which may be applied by the functional block of weighting factor adjustment 450, is provided below.

1) Start from $\alpha$=0.5, and set the sign of moving direction to '+1';
2) If decoding fails, toggle the sign of direction (i.e., +1→−1, −1→+1);
3) Change $\alpha$, i.e., $\alpha=\alpha+sign*\Delta$;
4) If $\alpha$>1, reset $\alpha$ to 1, and if $\alpha$<0, reset $\alpha$ to 0; and
5) Wait for the next packet, and proceed to step 2.

In FIG. 4, although the adjustment of $\alpha$ occurs outside of the functional block of decoding 440 (e.g., a turbo decoder), the weighting factor $\alpha$ may alternatively be controlled inside the functional block of decoding 440 after each turbo decoding iteration. In this case, in addition to the decoding success/failure information, the quality of the decoding results may also be used. The sum of magnitude of LLR is a good example of the metric that represents the quality of the decoding results. For instance, the higher the magnitudes of LLR are, the more reliable the current decoding results are. This relationship is used to fine-tune the weighting factor $\alpha$. Any similar metrics may also be used.

The new weighting factor $\alpha$ is used for the next decoding trial with the next packet transmission. Note that the moving direction of $\alpha$ does not change until the decoding fails. This is required because a UE may or may not know which of first receiver and second receiver is the better choice. The choice could also change depending on the various interference scenarios. When the decoding fails, the control algorithm may determine that the current direction is not a good choice. The moving direction may change, or toggle, when the decoding fails. Therefore, the proposed algorithm may find the good direction in all different cases.

Figure 5:
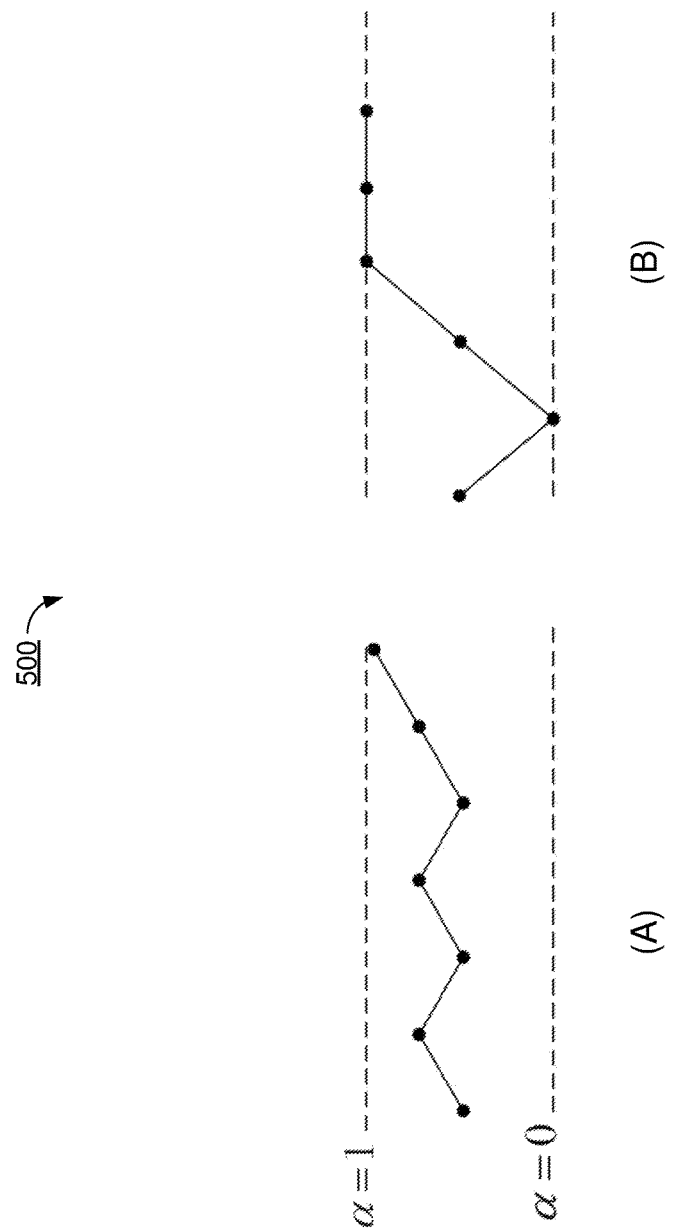
FIG. 5 is a diagram of example expected behaviors of weighting factor with various step sizes in accordance with the present disclosure.

The step size in adjustment of the weighting factor $\alpha$, $\Delta$, may be configured to exhibit desirable tracking results. FIG. 5 is a diagram of example expected behaviors of weighting factor with various step sizes in accordance with the present disclosure. Part (A) of FIG. 5 shows example behavior of the weighting factor with smaller step size. Part (B) of FIG. 5 shows example behavior of the weighting factor with larger step size.

It is noteworthy that although the example illustrated in FIG. 4 shows the functional blocks of two component receivers, the fourth combining technique is applicable to implementations in which there are more than two component receivers. Therefore, the scope of implementations based on the fourth combining technique in accordance with the present disclosure is not limited to two component receivers.

Example Implementations

Figure 6:
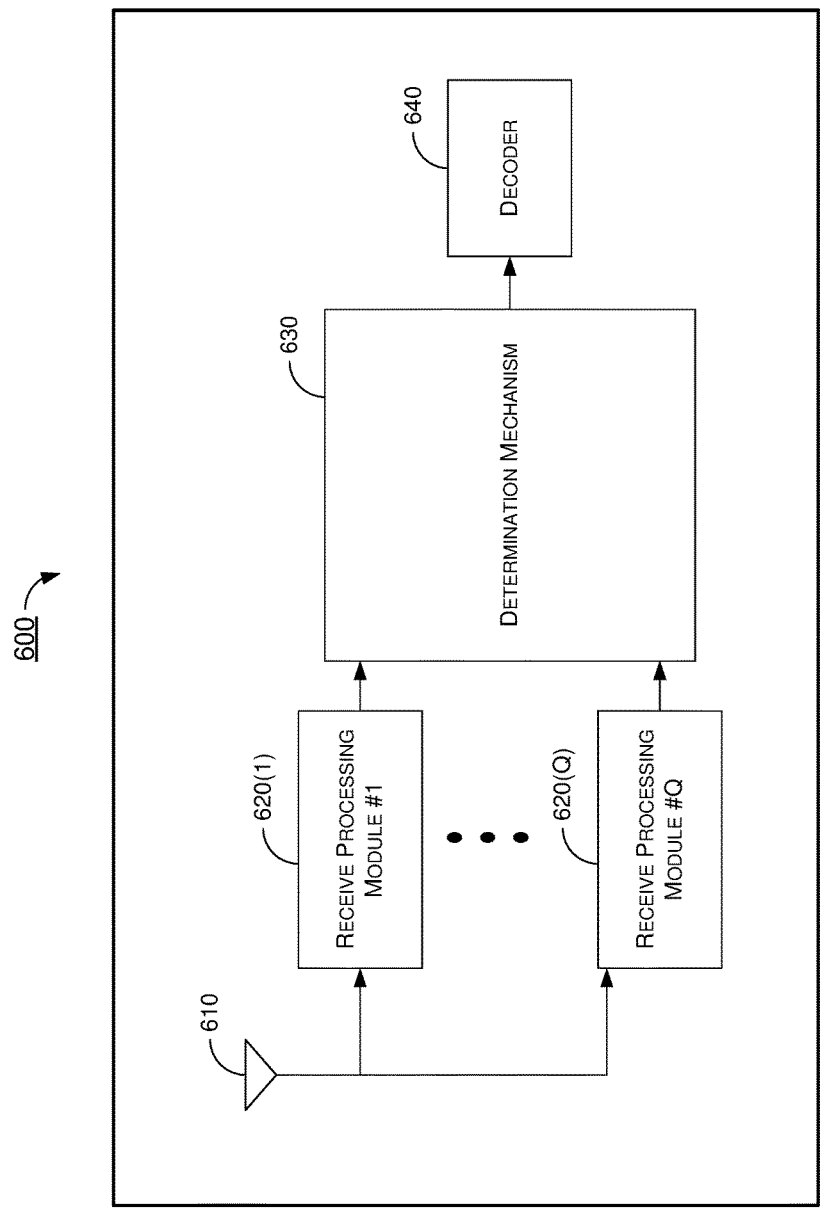
FIG. 6 is a simplified block diagram of an example apparatus in accordance with the present disclosure.

FIG. 6 illustrates an example apparatus 600 in accordance with the present disclosure. In some implementations, apparatus 600 may be an electronic apparatus. For instance, apparatus 600 may be a computing apparatus, a communication apparatus, a portable apparatus or a wearable apparatus. In some implementations, apparatus 600 may be a smartphone, a tablet computer, a laptop computer, a notebook computer, a desktop computer, a wearable computing apparatus, a wearable communication apparatus or the like. In some implementations, apparatus 600 may be a single integrated-circuit (IC) chip, a chip set or multiple discrete and separate IC chips. Regardless of the form in which apparatus 600 is implemented, apparatus 600 may be configured to implement receiver architecture 100, receiver architecture 200, receiver architecture 300 and receiver architecture 400 described above.

Apparatus 600 may include various components including those shown in FIG. 6. To avoid obscuring the figure and to focus on components and features pertinent to the present disclosure, components of apparatus 600 relevant to implementations of the present disclosure are shown in FIG. 6 while other components of apparatus 600 are not shown. Referring to FIG. 6, apparatus 600 may include an antenna 610, multiple receive processing modules 620(1)-620(Q) with Q being a positive integer greater than or equal to 2, a determination mechanism 630, and a decoder 640. Each of multiple receive processing modules 620(1)-620(Q), determination mechanism 630 and decoder 640 may be implemented in the form of hardware, software, firmware, middleware, or any combination thereof. In some implementations, one or more of multiple receive processing modules 620(1)-620(Q), determination mechanism 630 and decoder 640 may be implemented in the form of hardware including, for example, one or more transistors, one or more diodes, one or more capacitors, one or more resistors, one or more inductors and/or one or more memristors.

Antenna 610 may be configured to receive an incoming signal. The multiple receive processing modules 620(1)-620(Q) may include at least a first receive processing module and a second receive processing module. Each of the multiple receive processing modules 620(1)-620(Q) may be coupled to antenna 610 and configured to receive the incoming signal from antenna 610 and process the incoming signal to produce a respective processing result. Determination mechanism 630 may be configured to receive the processing results from the multiple receive processing modules 620(1)-620(Q) and generate a determination output. The determination output may include either of: (1) one or more decoding metrics based on a respective processing result from one of the multiple receive processing modules 620(1)-620(Q), or (2) a weighted combination of more than one respective processing result from more than one receive processing module of the multiple receive processing modules 620(1)-620(Q). Decoder 640 may be configured to receive the determination output from determination mechanism 630 and decode the determination output to provide a decoded signal.

In some implementations, the first receive processing module may include a MMSE-IRC receive processing module, and the second receive processing module may include a NAICS receive processing module.

In some implementations in which receiver architecture 100 is employed, determination mechanism 630 may include a plurality of weight calculation modules each of which corresponding to a respective one of the multiple receive processing modules 620(1)-620(Q). Each weight calculation module may be configured to receive the respective processing result from the respective receive processing module and generate a respective weighting factor. The plurality of weight calculation modules may include at least a first weight calculation module and a second weight calculation module corresponding to the first receive processing module and the second receive processing module, respectively. Additionally, determination mechanism 630 may include a plurality of decoding metric generation modules each of which corresponding to a respective one of the multiple receive processing modules 620(1)-620(Q). Each decoding metric generation module may be configured to receive the respective processing result from the respective receive processing module and generate respective one or more decoding metrics. The plurality of decoding metric generation modules may include at least a first decoding metric generation module and a second decoding metric generation module corresponding to the first receive processing module and the second receive processing module, respectively. Moreover, determination mechanism 630 may include a combining module configured to receive the weighting factors and decoding metrics from the plurality of weight calculation modules and the plurality of decoding metric generation modules, respectively, to generate the determination output. In some implementations, the first weight calculation module may be configured to generate a first probability $P_1$ as a first weighting factor, the second weight calculation module may be configured to generate a second probability $P_2$ as a second weighting factor, the first decoding metric generation module may be configured to generate one or more first decoding metrics $L_i$, the second decoding metric generation module may be configured to generate one or more second decoding metrics $R_i$, with $0 \leq i \leq n-1$ and n being a number of symbols in the incoming signal, and the determination output may be expressed by an equation as follows: $(P_1/(P_1+P_2))*L_i+(P_2/(P_1+P_2))*R_i$.

In some implementations in which receiver architecture 200 is employed, determination mechanism 630 may include a plurality of weight calculation modules each of which corresponding to a respective one of the multiple receive processing modules 620(1)-620(Q). Each weight calculation module may be configured to receive the respective processing result from the respective receive processing module and generate a respective weighting factor. The plurality of weight calculation modules may include at least a first weight calculation module and a second weight calculation module corresponding to the first receive processing module and the second receive processing module, respectively. Additionally, determination mechanism 630 may include a plurality of decoding metric generation modules each of which corresponding to a respective one of the multiple receive processing modules 620(1)-620(Q). Each decoding metric generation module may be configured to receive the respective processing result from the respective receive processing module and generate respective one or more decoding metrics. The plurality of decoding metric generation modules may include at least a first decoding metric generation module and a second decoding metric generation module corresponding to the first receive processing module and the second receive processing module, respectively. Moreover, determination mechanism 630 may include a decision module configured to receive the respective weighting factors from the plurality of weight calculation modules and select one of the plurality of decoding metric generation modules to provide the respective one or more decoding metrics as the determination output to the decoder for decoding. In some implementations, the first weight calculation module may be configured to generate a first probability $P_1$ as a first weighting factor, the second weight calculation module may be configured to generate a second probability $P_2$ as a second weighting factor, the decision module may select the first decoding metric generation module to provide one or more first decoding metrics to the decoder in an event that the decision module determines that $P_1$ is greater than $P_2$, and the decision module may select the second decoding metric generation module to provide one or more second decoding metrics to the decoder in an event that the decision module determines that $P_1$ is not greater than $P_2$.

In some implementations in which receiver architecture 300 is employed, determination mechanism 630 may include a plurality of weight calculation modules each of which corresponding to a respective one of the multiple receive processing modules 620(1)-620(Q). Each weight calculation module may be configured to receive the respective processing result from the respective receive processing module and generate a respective weighting factor. The plurality of weight calculation modules may include at least a first weight calculation module and a second weight calculation module corresponding to the first receive processing module and the second receive processing module, respectively. Additionally, determination mechanism 630 may include a probability combining and decoding metric calculation module configured to receive the respective processing results from the multiple receive processing modules 620(1)-620(Q) and receive the respective weighting factors from the plurality of weight calculation modules. The probability combining and decoding metric calculation module may be also configured to perform log-likelihood ratio (LLR) combining before calculating one or more decoding metrics to generate the determination output. In some implementations, the first weight calculation module may be configured to generate a first probability $P_1$ as a first weighting factor, the second weight calculation module may be configured to generate a second probability $P_2$ as a second weighting factor, and the determination output may be expressed by an equation as follows:

$$LLR = \log \frac{p_1(y \mid b = 0) w_{rec1} + p_2(y \mid b = 0) w_{rec2}}{p_1(y \mid b = 1) w_{rec1} + p_2(y \mid b = 1) w_{rec2}},$$

with b denoting transmitted bits, $w_{rec1}$ denoting a first normalized weighting factor corresponding to the first receive processing module, and $w_{rec2}$ denoting a second normalized weighting factor corresponding to the second receive processing module.

In some implementations in which receiver architecture 400 is employed, determination mechanism 630 may include a plurality of decoding metric generation modules each of which corresponding to a respective one of the multiple receive processing modules 620(1)-620(Q). Each decoding metric generation module may be configured to receive the respective processing result from the respective receive processing module and generate respective one or more decoding metrics. The plurality of decoding metric generation modules may include at least a first decoding metric generation module and a second decoding metric generation module corresponding to the first receive processing module and the second receive processing module, respectively. Additionally, determination mechanism 630 may include a combining module configured to receive the decoding metrics from the plurality of decoding metric generation modules to generate the determination output using a weighting factor. Moreover, determination mechanism 630 may include a weighting factor adjustment module configured to receive the decoded signal and adjust the weighting factor based on the decoded signal. In some implementations, the first decoding metric generation module may be configured to generate one or more first decoding metrics $L_i$, the second decoding metric generation module may be configured to generate one or more second decoding metrics $R_i$, with $0 \le i \le n-1$ and n being a number of symbols in the incoming signal, and the determination output may be expressed by an equation as follows: $(1-\alpha)*L_i+\alpha*R_i$, with $\alpha$ denoting the weighting factor that is adjusted utilizing a decoding result of the decoder.

Figure 7:
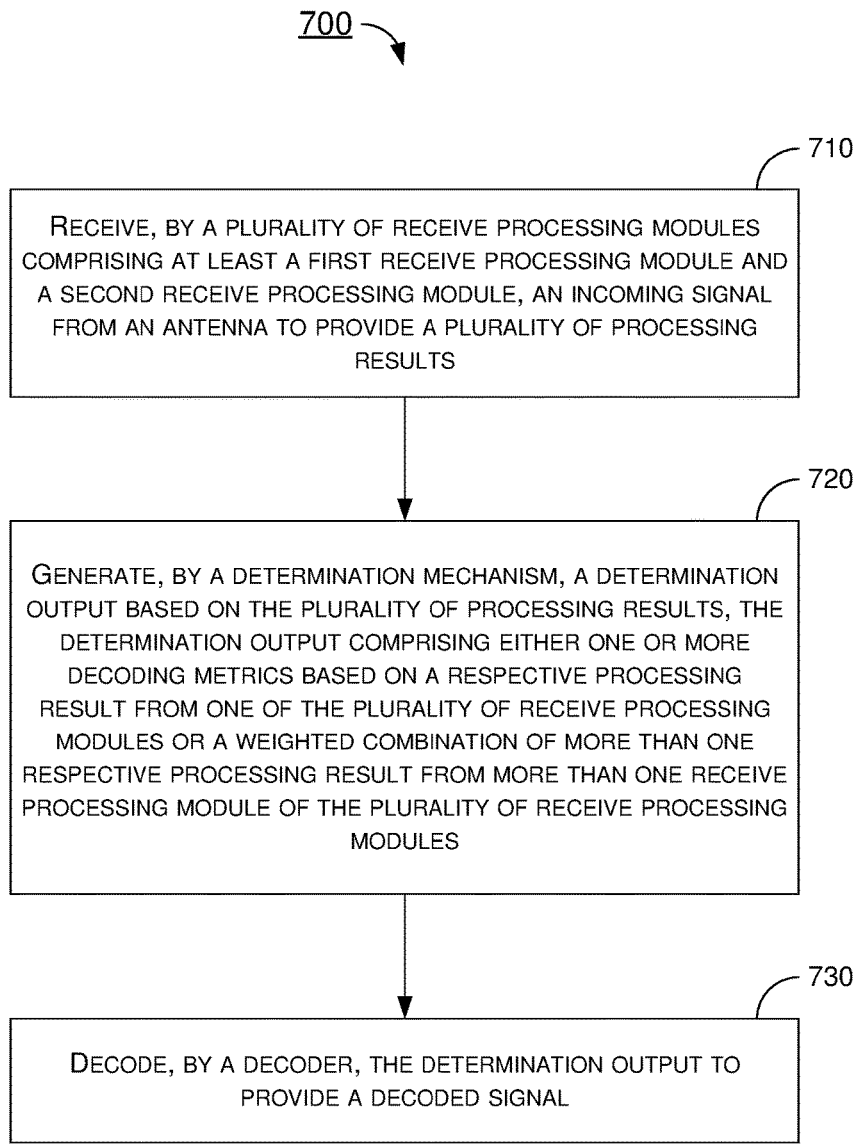
FIG. 7 is a flowchart of an example process in accordance with an implementation of the present disclosure.

FIG. 7 illustrates an example process 700 in accordance with an implementation of the present disclosure. Process 700 may include one or more operations, actions, or functions as represented by one or more of blocks 710, 720 and 730. Although illustrated as discrete blocks, various blocks of process 700 may be divided into additional blocks, combined into fewer blocks, or eliminated, depending on the desired implementation. Process 700 may be implemented by receiver architecture 100, receiver architecture 200, receiver architecture 300, receiver architecture 400 and apparatus 600, as well as any variations thereof. Example process 700 may begin at 710.

At 710, process 700 may involve a plurality of receive processing modules receiving an incoming signal from an antenna to provide a plurality of processing results. The plurality of receive processing modules may include at least a first receive processing module and a second receive processing module. Process 700 may proceed from 710 to 720.

At 720, process 700 may involve a determination mechanism generating a determination output based on the plurality of processing results. The determination output may include either of: (1) one or more decoding metrics based on a respective processing result from one of the plurality of receive processing modules, or (2) a weighted combination of more than one respective processing result from more than one receive processing module of the plurality of receive processing modules. Process 700 may proceed from 720 to 730.

At 730, process 700 may involve a decoder decoding the determination output to provide a decoded signal.

In some implementations, the first receive processing module may include a MMSE-IRC receive processing module, and the second receive processing module may include a NAICS receive processing module.

In some implementations and with reference to receiver architecture 100, in generating the determination output, process 700 may involve a plurality of weight calculation modules generating weighting factors. Each of the plurality of weight calculation modules may correspond to a respective one of the plurality of receive processing modules. Each of the weighting factors may be generated based on a respective processing result from a respective one of the plurality of receive processing modules. The plurality of weight calculation modules may include at least a first weight calculation module and a second weight calculation module corresponding to the first receive processing module and the second receive processing module, respectively. Additionally, process 700 may involve a plurality of decoding metric generation modules generating decoding metrics. Each of the plurality of decoding metric generation modules may correspond to a respective one of the plurality of receive processing modules. Each of the decoding metrics may be generated based on a respective processing result from a respective one of the plurality of receive processing modules. The plurality of decoding metric generation modules may include at least a first decoding metric generation module and a second decoding metric generation module corresponding to the first receive processing module and the second receive processing module, respectively. Moreover, process 700 may involve a combining module, which is configured to receive the weighting factors and decoding metrics, generating the determination output. In some implementations, the first weight calculation module may be configured to generate a first probability $P_1$ as a first weighting factor, the second weight calculation module may be configured to generate a second probability $P_2$ as a second weighting factor, the first decoding metric generation module may be configured to generate one or more first decoding metrics $L_i$, the second decoding metric generation module may be configured to generate one or more second decoding metrics $R_i$, with $0 \le i \le n-1$ and n being a number of symbols in the incoming signal, and the determination output may be expressed by an equation as follows: $(P_1/(P_1+P_2))*L_i+(P_2/(P_1+P_2))*R_i$.

Alternatively and with reference to receiver architecture 200, in generating the determination output, process 700 may involve a plurality of weight calculation modules generating weighting factors. Each of the plurality of weight calculation modules may correspond to a respective one of the plurality of receive processing modules. Each of the weighting factors may be generated based on a respective processing result from a respective one of the plurality of receive processing modules. The plurality of weight calculation modules may include at least a first weight calculation module and a second weight calculation module corresponding to the first receive processing module and the second receive processing module, respectively. Additionally, process 700 may involve a plurality of decoding metric generation modules generating decoding metrics. Each of the plurality of decoding metric generation modules may correspond to a respective one of the plurality of receive processing modules. Each of the decoding metrics may be generated based on a respective processing result from a respective one of the plurality of receive processing modules. The plurality of decoding metric generation modules may include at least a first decoding metric generation module and a second decoding metric generation module corresponding to the first receive processing module and the second receive processing module, respectively. Moreover, process 700 may involve a decision module, configured to receive the respective weighting factors from the plurality of weight calculation modules, selecting one of the plurality of decoding metric generation modules to provide respective one or more decoding metrics as the determination output to the decoder for decoding. In some implementations, the first weight calculation module may be configured to generate a first probability $P_1$ as a first weighting factor, the second weight calculation module may be configured to generate a second probability $P_2$ as a second weighting factor, the decision module may select the first decoding metric generation module to provide one or more first decoding metrics to the decoder in an event that the decision module determines that $P_1$ is greater than $P_2$, and the decision module may select the second decoding metric generation module to provide one or more second decoding metrics to the decoder in an event that the decision module determines that $P_1$ is not greater than $P_2$.

Alternatively and with reference to receiver architecture 300, in generating the determination output, process 700 may involve a plurality of weight calculation modules generating weighting factors. Each of the plurality of weight calculation modules may correspond to a respective one of the plurality of receive processing modules. Each of the weighting factors may be generated based on a respective processing result from a respective one of the plurality of receive processing modules. The plurality of weight calculation modules may include at least a first weight calculation module and a second weight calculation module corresponding to the first receive processing module and the second receive processing module, respectively. Additionally, process 700 may involve a probability combining and decoding metric calculation module, configured to receive the processing results from the plurality of receive processing modules and receive the weighting factors from the plurality of weight calculation modules, generating the determination output by performing LLR combining before calculating one or more decoding metrics. In some implementations, the first weight calculation module may be configured to generate a first probability $P_1$ as a first weighting factor, the second weight calculation module may be configured to generate a second probability $P_2$ as a second weighting factor, and the determination output may be expressed by an equation as follows:

$$LLR = \log \frac{p_1(y|b=0)w_{rec1} + p_2(y|b=0)w_{rec2}}{p_1(y|b=1)w_{rec1} + p_2(y|b=1)w_{rec2}},$$

with b denoting transmitted bits, $w_{rec1}$ denoting a first normalized weighting factor corresponding to the first receive processing module, and $w_{rec2}$ denoting a second normalized weighting factor corresponding to the second receive processing module.

Alternatively and with reference to receiver architecture 400, in generating the determination output, process 700 may involve a plurality of decoding metric generation modules generating decoding metrics. Each of the plurality of decoding metric generation modules may correspond to a respective one of the plurality of receive processing modules. Each of the decoding metrics may be generated based on a respective processing result from a respective one of the plurality of receive processing modules. The plurality of decoding metric generation modules may include at least a first decoding metric generation module and a second decoding metric generation module corresponding to the first receive processing module and the second receive processing module, respectively. Additionally, process 700 may involve a combining module, configured to receive the decoding metrics from the plurality of decoding metric generation modules, generating the determination output using a weighting factor. Moreover, process 700 may involve a weighting factor adjustment module, configured to receive the decoded signal, adjusting the weighting factor based on the decoded signal. In some implementations, the first decoding metric generation module may be configured to generate one or more first decoding metrics $L_i$, the second decoding metric generation module may be configured to generate one or more second decoding metrics $R_i$, with $0 \le i \le n-1$ and n being a number of symbols in the incoming signal, and the determination output may be expressed by an equation as follows: $(1-\alpha)*L_i+\alpha*R_i$, with $\alpha$ denoting the weighting factor that is adjusted utilizing a decoding result of the decoder.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An apparatus, comprising:
   an antenna configured to receive an incoming signal;
   a plurality of receive processing circuits comprising at least a first receive processing circuit and a second receive processing circuit, each of the plurality of receive processing circuits coupled to the antenna and configured to receive the incoming signal from the antenna and process the incoming signal to produce a respective processing result;
   a determination circuit configured to receive the processing results from the plurality of receive processing circuits and generate a determination output, the determination output comprising either one or more decoding metrics based on a respective processing result from one of the plurality of receive processing circuits or a weighted combination of more than one respective processing result from more than one receive processing circuit of the plurality of receive processing circuits; and
   a decoder configured to receive the determination output from the determination circuit and decode the determination output to provide a decoded signal,
   wherein the determination circuit comprises:
      a plurality of weight calculation circuits each of which corresponding to a respective one of the plurality of receive processing circuits, each weight calculation circuit configured to receive the respective processing result from the respective receive processing circuit and generate a respective weighting factor, the plurality of weight calculation circuits comprising at least a first weight calculation circuit and a second weight calculation circuit corresponding to the first receive processing circuit and the second receive processing circuit, respectively;
      a plurality of decoding metric generation circuits each of which corresponding to a respective one of the plurality of receive processing circuits, each decoding metric generation circuit configured to receive the respective processing result from the respective receive processing circuit and generate respective one or more decoding metrics, the plurality of decoding metric generation circuits comprising at least a first decoding metric generation circuit and a second decoding metric generation circuit corresponding to the first receive processing circuit and the second receive processing circuit, respectively; and
      a decision circuit configured to receive the respective weighting factors from the plurality of weight calculation circuits and select one of the plurality of decoding metric generation circuits to provide the respective one or more decoding metrics as the determination output to the decoder for decoding.

2. The apparatus of claim 1, wherein the first receive processing circuit comprises a Minimum Mean Square Error and Interference Rejection Combiner (MMSE-IRC) receive processing circuit, and wherein the second receive processing circuit comprises a Network Assisted Interference Cancellation and Suppression (NAICS) receive processing circuit.

3. The apparatus of claim 1, wherein:
the first weight calculation circuit is configured to generate a first probability $P_1$ as a first weighting factor;
the second weight calculation circuit is configured to generate a second probability $P_2$ as a second weighting factor;
the decision circuit selects the first decoding metric generation circuit to provide one or more first decoding metrics to the decoder in an event that the decision circuit determines that $P_1$ is greater than $P_2$; and
the decision circuit selects the second decoding metric generation circuit to provide one or more second decoding metrics to the decoder in an event that the decision circuit determines that $P_1$ is not greater than $P_2$.

4. A method, comprising:
receiving, by a plurality of receive processing modules comprising at least a first receive processing module and a second receive processing module, an incoming signal from an antenna to provide a plurality of processing results;
generating, by a determination mechanism, a determination output based on the plurality of processing results, the determination output comprising either one or more decoding metrics based on a respective processing result from one of the plurality of receive processing modules or a weighted combination of more than one respective processing result from more than one receive processing module of the plurality of receive processing modules; and
decoding, by a decoder, the determination output to provide a decoded signal,
wherein the generating of the determination output comprises:
generating, by a plurality of weight calculation modules each of which corresponding to a respective one of the plurality of receive processing modules, weighting factors each of which generated based on a respective processing result from a respective one of the plurality of receive processing modules, the plurality of weight calculation modules comprising at least a first weight calculation module and a second weight calculation module corresponding to the first receive processing module and the second receive processing module, respectively;
generating, by a plurality of decoding metric generation modules each of which corresponding to a respective one of the plurality of receive processing modules, decoding metrics each of which generated based on a respective processing result from a respective one of the plurality of receive processing modules, the plurality of decoding metric generation modules comprising at least a first decoding metric generation module and a second decoding metric generation module corresponding to the first receive processing module and the second receive processing module, respectively; and
selecting, by a decision module configured to receive the respective weighting factors from the plurality of weight calculation modules, one of the plurality of decoding metric generation modules to provide respective one or more decoding metrics as the determination output to the decoder for decoding.

5. The method of claim 4, wherein the first receive processing module comprises a Minimum Mean Square Error and Interference Rejection Combiner (MMSE-IRC) receive processing module, and wherein the second receive processing module comprises a Network Assisted Interference Cancellation and Suppression (NAICS) receive processing module.

6. The method of claim 4, wherein:
the first weight calculation module is configured to generate a first probability $P_1$ as a first weighting factor;
the second weight calculation module is configured to generate a second probability $P_2$ as a second weighting factor;
the decision module selects the first decoding metric generation module to provide one or more first decoding metrics to the decoder in an event that the decision module determines that $P_1$ is greater than $P_2$; and
the decision module selects the second decoding metric generation module to provide one or more second decoding metrics to the decoder in an event that the decision module determines that $P_1$ is not greater than $P_2$.

* * * * *